United States Patent
Poirot-Crouvezier et al.

(10) Patent No.: US 10,193,175 B2
(45) Date of Patent: Jan. 29, 2019

(54) PROCESS FOR SUPPLYING A FUEL CELL HAVING ALTERNATE SUPPLY AND PURGE PHASES

(71) Applicant: COMMISSARIAT A L'ENERGIE ATOMIQUE ET AUX ENERGIES ALTERNATIVES, Paris (FR)

(72) Inventors: Jean-Philippe Poirot-Crouvezier, Saint Georges de Commiers (FR); Didier Buzon, Grenoble (FR); Fabrice Micoud, La Buisse (FR); Remi Vincent, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 139 days.

(21) Appl. No.: 15/192,436

(22) Filed: Jun. 24, 2016

(65) Prior Publication Data

US 2016/0380291 A1 Dec. 29, 2016

(30) Foreign Application Priority Data

Jun. 25, 2015 (FR) ...................................... 15 55884

(51) Int. Cl.
| | | |
|---|---|---|
| *H01M 8/04746* | (2016.01) | |
| *H01M 8/04082* | (2016.01) | |
| *H01M 8/04223* | (2016.01) | |
| *H01M 8/2483* | (2016.01) | |
| *H01M 8/249* | (2016.01) | |
| *H01M 8/04119* | (2016.01) | |
| *H01M 8/2484* | (2016.01) | |

(52) U.S. Cl.
CPC ... *H01M 8/04753* (2013.01); *H01M 8/04179* (2013.01); *H01M 8/04201* (2013.01); *H01M 8/04231* (2013.01); *H01M 8/249* (2013.01); *H01M 8/2483* (2016.02); *H01M 8/2484* (2016.02)

(58) Field of Classification Search
CPC ............. H01M 8/249; H01M 8/04179; H01M 8/04201; H01M 8/2484; H01M 8/2483; H01M 8/04231; H01M 8/04753
See application file for complete search history.

(56) References Cited

U.S. PATENT DOCUMENTS

| | | | | |
|---|---|---|---|---|
| 6,821,668 | B1* | 11/2004 | Perry ................ | H01M 8/04231 429/443 |
| 2005/0233188 | A1* | 10/2005 | Kurashima ......... | H01M 8/2425 429/411 |
| 2014/0072896 | A1* | 3/2014 | Poirot-Crouvezier ...................... | H01M 8/04097 429/444 |

FOREIGN PATENT DOCUMENTS

WO WO 2012/152623 A1 11/2012

OTHER PUBLICATIONS

French Preliminary Search Report dated Apr. 15, 2016 with Written Opinion in French Application 15 55884 filed on Jun. 25, 2015 (with English Translation of Categories of Cited Documents).

* cited by examiner

*Primary Examiner* — Muhammad S Siddiquee
(74) *Attorney, Agent, or Firm* — Oblon, McClelland, Maier & Neustadt, L.L.P.

(57) ABSTRACT

A process for supplying a fuel cell with reactive species, including a stack of electrochemical cells divided into N different groups, wherein a plurality of steps of selectively supplying the N groups of cells with reactive species are (Continued)

carried out, following each of the supply steps, a step of purging the N groups of cells is carried out.

9 Claims, 13 Drawing Sheets

PROCESS FOR SUPPLYING A FUEL CELL HAVING ALTERNATE SUPPLY AND PURGE PHASES

TECHNICAL FIELD

The field of the invention is that of fuel cells and more particularly that of managing the supply of fuel gas and/or oxidant to fuel cells. The invention applies in particular to the supply of atmospheric air containing oxygen to the cathodes of a hydrogen fuel cell.

PRIOR ART

A fuel cell is formed from a stack of electrochemical cells, each comprising an anode and a cathode that are electrically separated from one another by an electrolyte, in which an electrochemical reaction takes place between two reactants that are introduced continuously. In the case of a hydrogen fuel cell, the fuel (hydrogen) is introduced in contact with the anode, whereas the oxidant (oxygen), for example contained in air, is introduced in contact with the cathode. The reaction is subdivided into two half-reactions, an oxidation and a reduction, which take place one at the anode/electrolyte interface and the other at the cathode/electrolyte interface. It requires the presence of an ion conductor between the two electrodes, namely the electrolyte, and an electron conductor formed by the external electrical circuit. The stack of cells is the site of the electrochemical reaction: the reactants must be introduced therein, the products and the non-reactive species must be discharged therefrom, and also the heat produced.

At the fuel cell outlet, two configurations are customarily encountered. In a first case corresponding to an operation in so-called open mode, the anode and cathode outlets communicate with a fluid discharge pipe. Thus, when the fuel cell is supplied superstoichiometrically (ratio between the amount of reactant injected and the amount of reactant consumed greater than 1), the outgoing gas has a sufficient flow rate to discharge the water produced by the reaction, which may then be collected using a phase separator. To avoid losing the unconsumed reactant, a recirculation device is customarily provided, which reinjects the unconsumed reactant into the fuel cell inlet. However, due to the fluidic recirculation, the non-reactive species, such as nitrogen at the anode in the case of air being supplied at the cathode, see their molar concentration gradually increase, which makes it necessary to regularly carry out a step of purging the cell.

In a second case corresponding to an operation referred to as dead-end mode, the outlet of the anode is blocked and also, where appropriate, that of the cathode, and the fuel cell is supplied with reactants with a stoichiometric ratio substantially equal to 1. Thus, the amount of hydrogen introduced at the anode corresponds to the amount consumed during the reaction. In this case, the non-reactive species and the liquid water produced are not discharged, which leads to a gradual increase in their molar concentration in the cell. It is then necessary to regularly carry out a step of purging the cell, in order to discharge the non-reactive species and liquid water therefrom.

The permeation of nitrogen and the passage of water produced across the electrolyte between the cathode side and the anode side are the main reasons why one of these two operating modes should be applied at the anode. Recirculation is the mode that enables the best homogenization of the gas mixture at the anode, and consequently the lowest level of purging and of loss of hydrogen. On the other hand, it is the most complex mode to set up and to control. The situation is similar at the cathode when it is supplied with substantially pure oxygen.

FIG. 1 illustrates an example of a process for supplying a fuel cell as described in document WO2012/152623, which makes it possible to avoid the use of a recirculation while improving the homogenization of the gas mixture. In this example, the fuel cell 1 comprises a stack of electrochemical cells divided into two different groups, A and B, the groups of cells being supplied selectively with reactive species, here with hydrogen.

During a first step (phase 1), only a first group of cells, here group A, and not group B, is supplied with hydrogen and the unconsumed hydrogen circulates however between both groups by means of an outlet manifold Cs common to the cells of both groups. Thus, a gradient of molar concentration of reactive species appears along the fluidic pathway, from a maximum value at the inlet of group A (at the inlet manifold Ce-A) to a minimum value at the outlet of group B (here at the inlet manifold Ce-B). The cells of group B therefore have a zone of accumulation of non-reactive species and of liquid water (grey-shaded portion in FIG. 1) located at the end of the fluidic pathway.

During a second step (phase 2), the supply of the two groups is reversed, so as to supply group B and not group A. The unconsumed reactant in group B circulates between the two groups by means of the common outlet manifold Cs. Thus, in a similar manner to phase 1, the cells of group A have a zone of accumulation of non-reactive species and of liquid water located at the end of the fluidic pathway, here the inlet manifold Ce-A.

The alternation between the two steps carries out a mixing, in the cells of the fuel cell, of the non-reactive species and of the products of the reaction, which makes it possible to prevent the accumulation zone from stagnating in the same cells.

During a third step (phase 3), carried out after a series of alternations between the two supply steps, the cells of groups A and B are purged. To do this, the two groups are supplied simultaneously while keeping closed a purge valve Vp connecting the common outlet manifold Cs to an outlet orifice, then by opening the valve Vp. This purge step makes it possible to discharge the non-reactive species and liquid water that accumulate in the two groups during the supply steps.

However, this supply process may have the drawback, in particular when it is applied to supplying the fuel cell with diluted reactive fluid as is the case for example for supplying cathodes with atmospheric air, of having an impact on the electrical or electrochemical performance of the fuel cell.

SUMMARY OF THE INVENTION

The objective of the invention is to at least partly overcome the drawbacks of the prior art, and more particularly to propose a process for supplying a fuel cell with reactive species, the impact of which on the electrical or electrochemical performance of the fuel cell is minimized.

For this purpose, the invention proposes a process for supplying a fuel cell with reactive species, the fuel cell comprising a stack of electrochemical cells divided into N different groups of cells, N≥2, in which:

a plurality of steps of selectively supplying the N groups of cells with reactive species are carried out, during which a first group of cells is supplied, the reactive species not consumed in the first group circulating in the other groups by means of distribution lines that ensure the fluidic communication of the groups with one another and that are arranged so as to form, with the N groups, a fluidic pathway for the reactive species, going from the first group supplied to one or more last groups forming the end of the fluidic pathway.

According to the invention, following each of the supply steps, a step of purging the N groups of cells is carried out during which each of the groups is supplied simultaneously with reactive species, each group communicating with an outlet orifice of the fuel cell that enables the fluidic discharging of the N groups of cells.

The reactive species is diluted in a carrier gas. Furthermore, the first group supplied is different from one supply step to the next, that is to say between two successive supply steps.

Certain preferred but non-limiting aspects of this supply process are the following:

The fluidic distribution lines may be arranged with respect to the groups so that the direction of fluidic flow of the reactive species in a last group during a supply step is identical to the direction of fluidic flow in the same group during the following purge step.

The fluidic distribution lines may be arranged with respect to the groups so that the direction of fluidic flow of the reactive species in each of the N groups during a supply step is identical to the direction of fluidic flow in the same groups during the following purge step.

The fluidic distribution lines may be arranged with respect to the groups so that the direction of fluidic flow of the reactive species in the last group(s) during a purge step is identical to the direction of fluidic flow in the same group(s) during a following supply step.

The fluidic distribution lines may be arranged with respect to the groups so that the direction of fluidic flow of the reactive species in each of the groups during a purge step is identical to the direction of fluidic flow in each of the same groups during a following supply step.

The cells may each comprise an anode and cathode, the cathodes and/or the anodes of the stack of cells being supplied with reactive species diluted in a carrier fluid.

According to one embodiment, the cathodes are supplied with atmospheric air containing oxygen.

During said purge step, the molar flow rate of reactive species at the inlet of the groups of cells may be different between at least two of said groups.

During said purge step, the molar flow rate of reactive species at the inlet of a group of cells, this group being a last group during the preceding supply step, may be greater than that of at least one other group.

The invention also relates to a fuel cell, comprising:

an inlet orifice for supplying the fuel cell with reactive species diluted in a carrier gas, and an outlet orifice for discharging fluid out of the fuel cell;

a stack of electrochemical cells divided into N different groups of cells, N≥2, each group of cells comprising an inlet manifold for conveying the reactive species diluted in a reactive gas to the cells of the group and an outlet manifold for discharging fluid circulating in the cells;

fluidic supply lines suitable for selectively supplying the N groups of cells, connecting the inlet orifice to each of the inlet manifolds, and comprising at least one selector switch for allowing or blocking the flow between the inlet orifice to each of the inlet manifolds and so supplying a first group that is different from one supply step to the next;

fluidic distribution lines suitable for ensuring the fluidic communication of the groups with one another and arranged so as to form, with the N groups, a fluidic pathway for the reactive species, going from a first group intended to be supplied with reactive species to one or more last groups forming the end of the fluidic pathway;

purge lines connecting the outlet manifold(s) to the outlet orifice and comprising at least one switch for allowing or blocking the flow between the outlet manifold(s) and the outlet orifice.

According to the invention, the fuel cell comprises a discharge device connecting the last group, or at least one of the last groups, to the outlet orifice and suitable for discharging a fluid present therein.

The groups of cells may comprise a common outlet manifold enabling the fluidic communication of the cells of all the groups with one another, the fluidic distribution lines being formed from the common outlet manifold so that the first group is connected in series with the other groups, these being fluidically arranged parallel to one another thus forming several last groups, the discharge device comprising at least one discharge pipe connecting the inlet manifold of a last group to the outlet orifice.

Each of the N groups may comprise an outlet manifold, these being different from one another, the fluidic distribution lines comprising distribution pipes fluidically connecting the groups in series, from the first group to a last group, the discharge device comprising at least one discharge pipe connecting the last group to the outlet orifice.

The discharge device may comprise N discharge pipes connecting each outlet manifold to the outlet orifice and each provided with a purge valve.

The cells of the various groups may be stacked in an overlapping manner in one and the same stack, so that a cell of one group is adjacent to a cell of another group of the stack.

Figure 1:
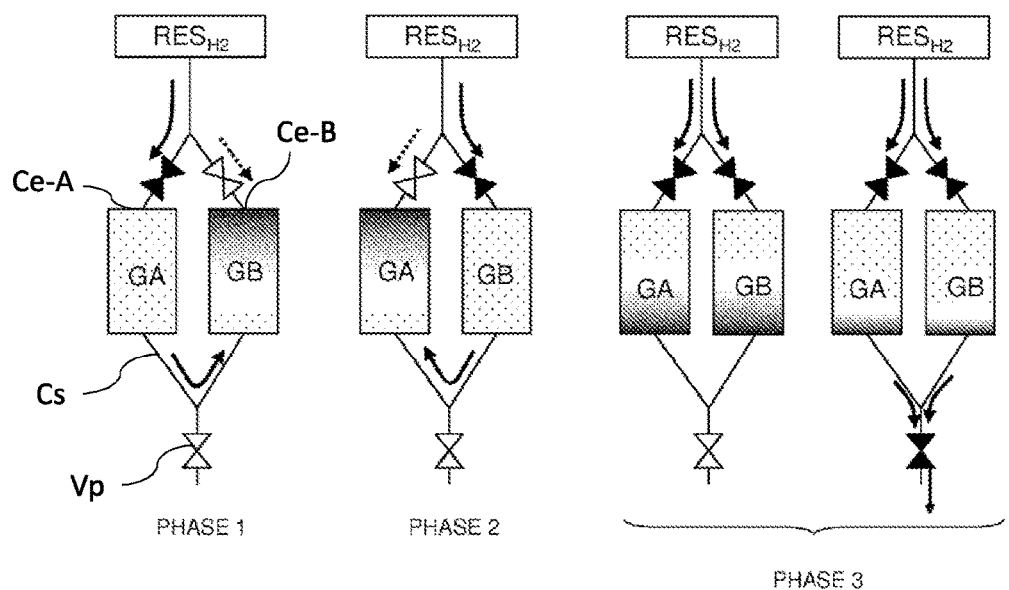
FIG. 1 illustrates an example of a process for supplying a fuel cell as described in prior art.
Figure 2:
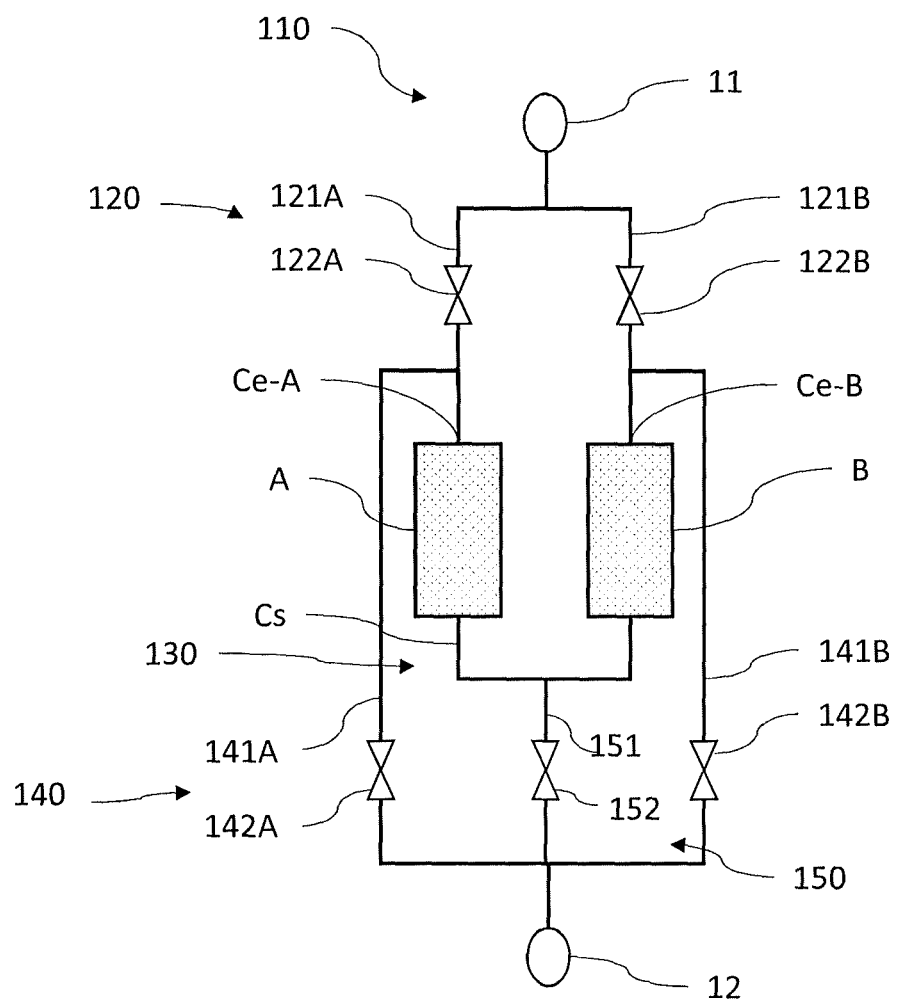
Figure 3A:
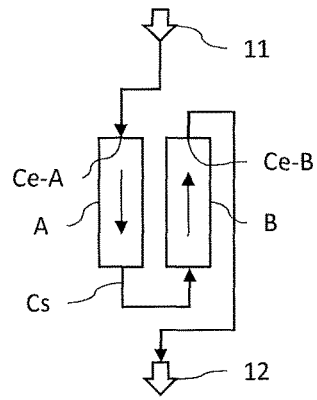
Figure 3B:
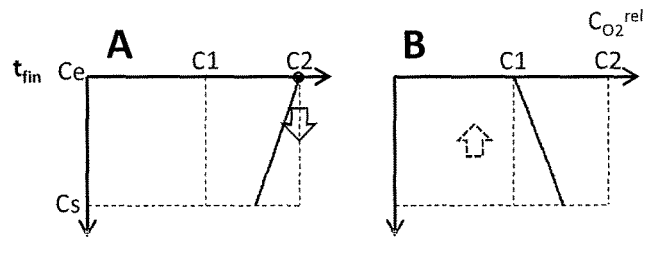
Figure 3C:
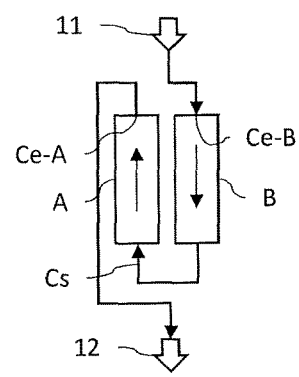
Figure 3D:
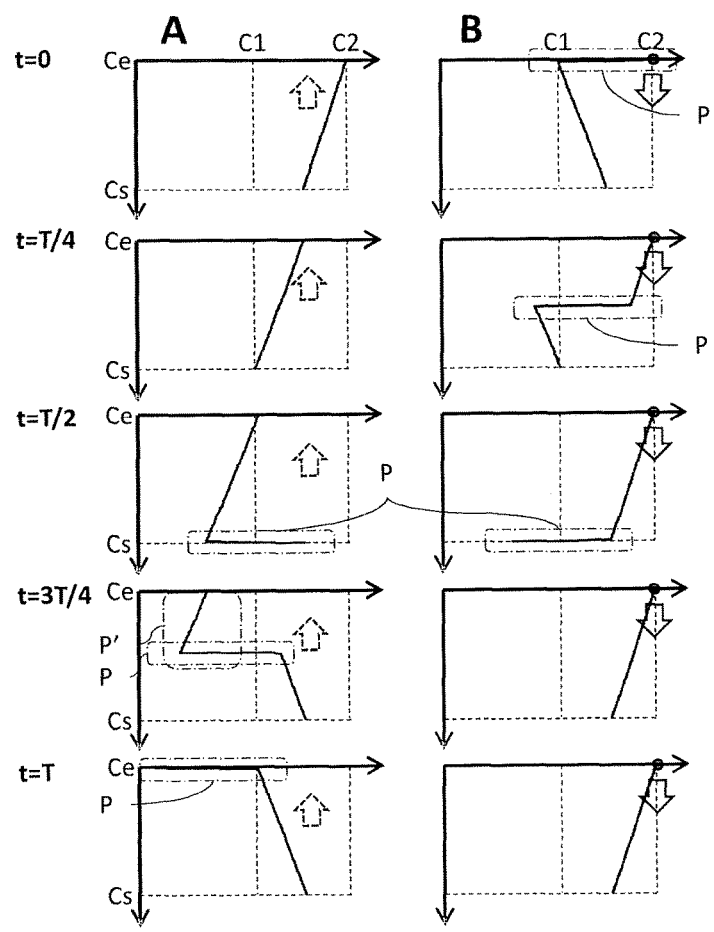
Figure 3E:
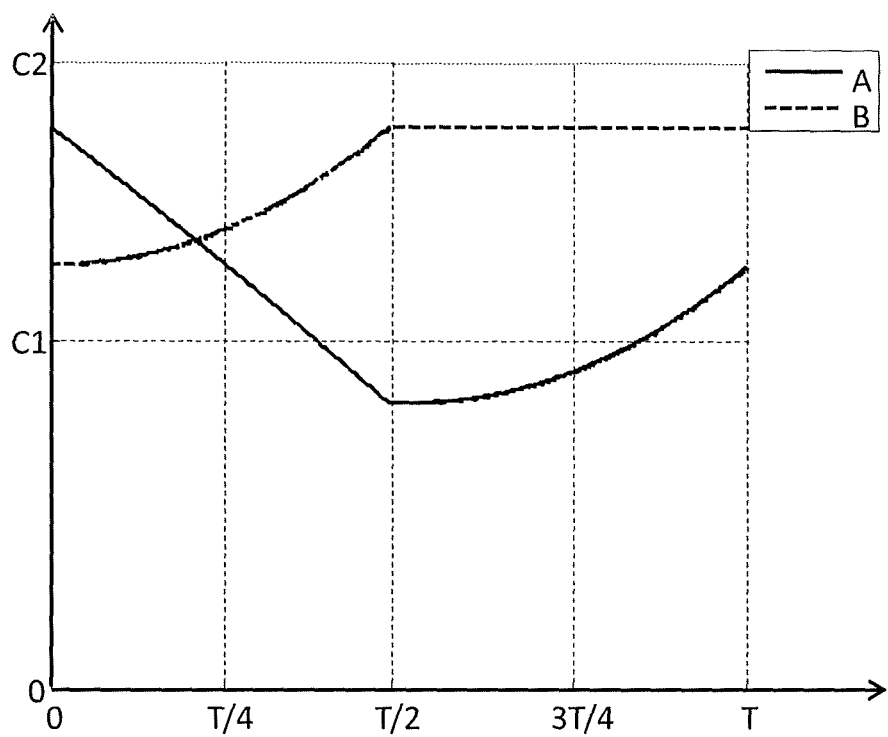
Figure 4A:
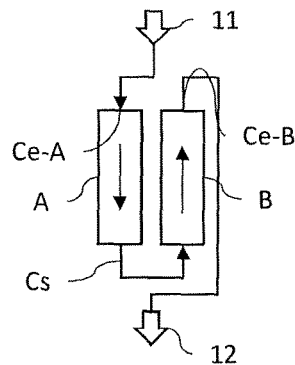
Figure 4B:
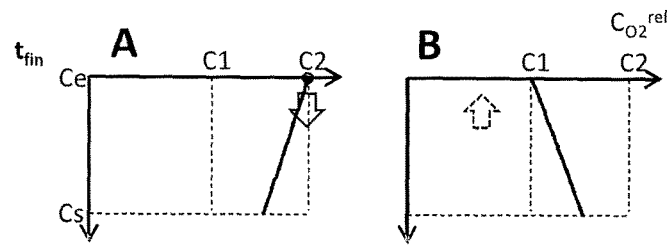
Figure 4C:
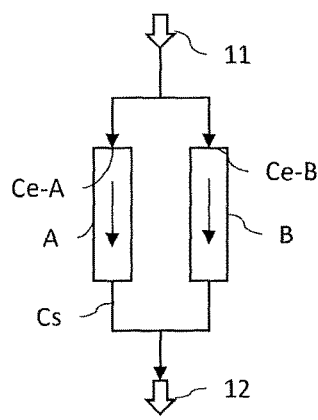
Figure 4D:
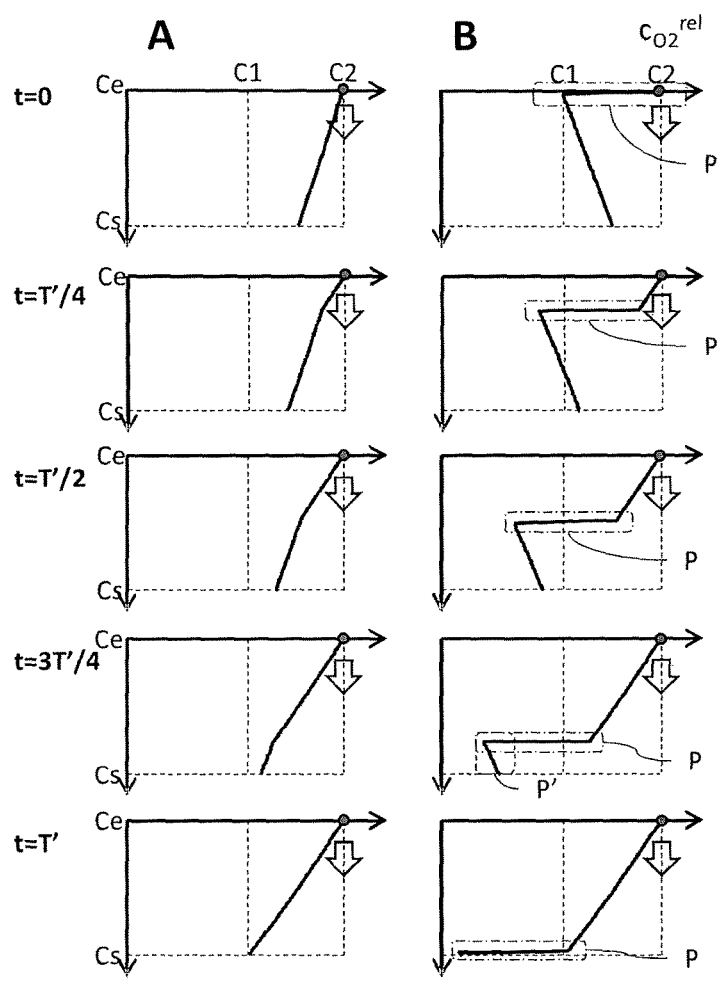
Figure 4E:
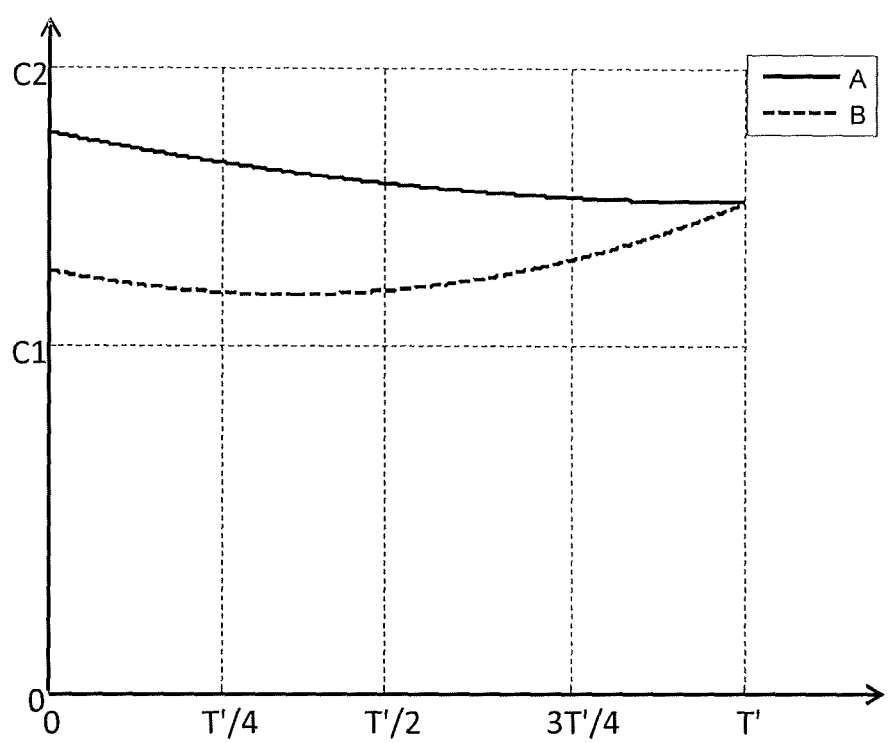
Figure 5A:
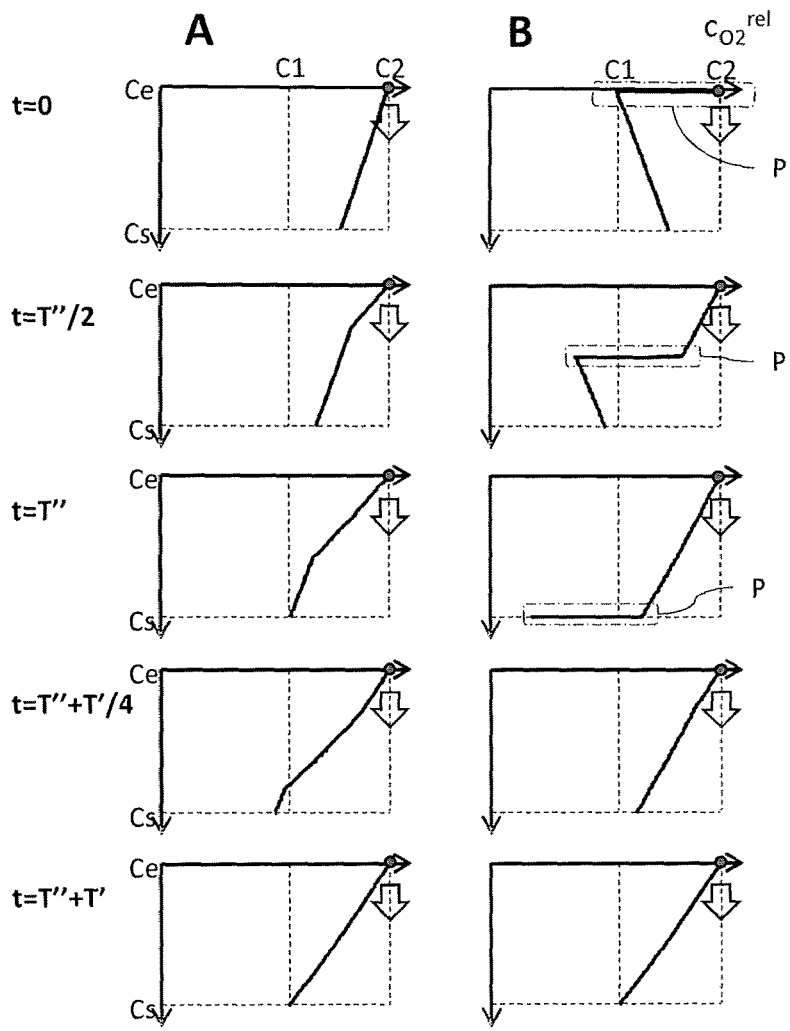
Figure 5B:
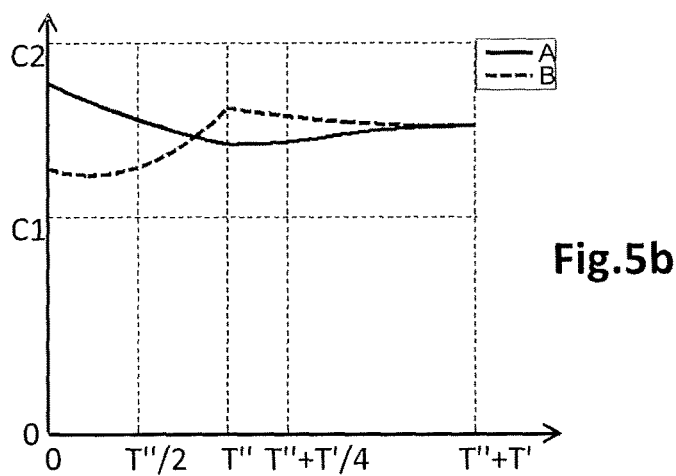
Figure 6A:
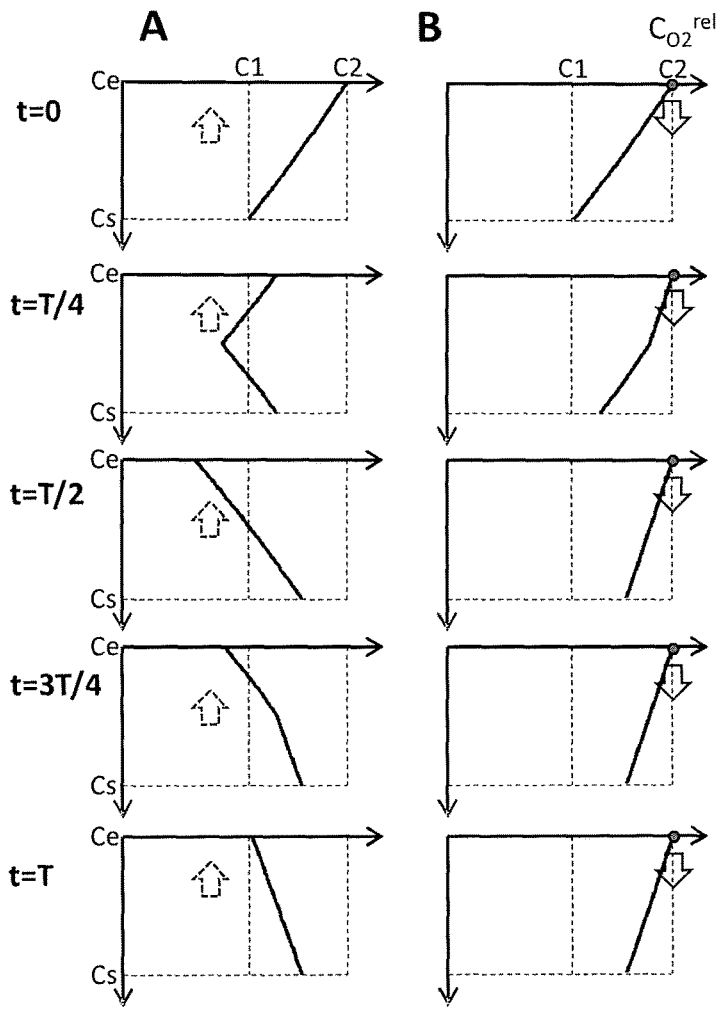
Figure 6B:
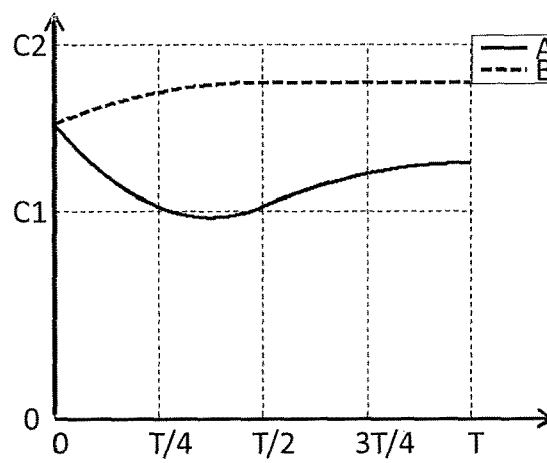
Figure 7:
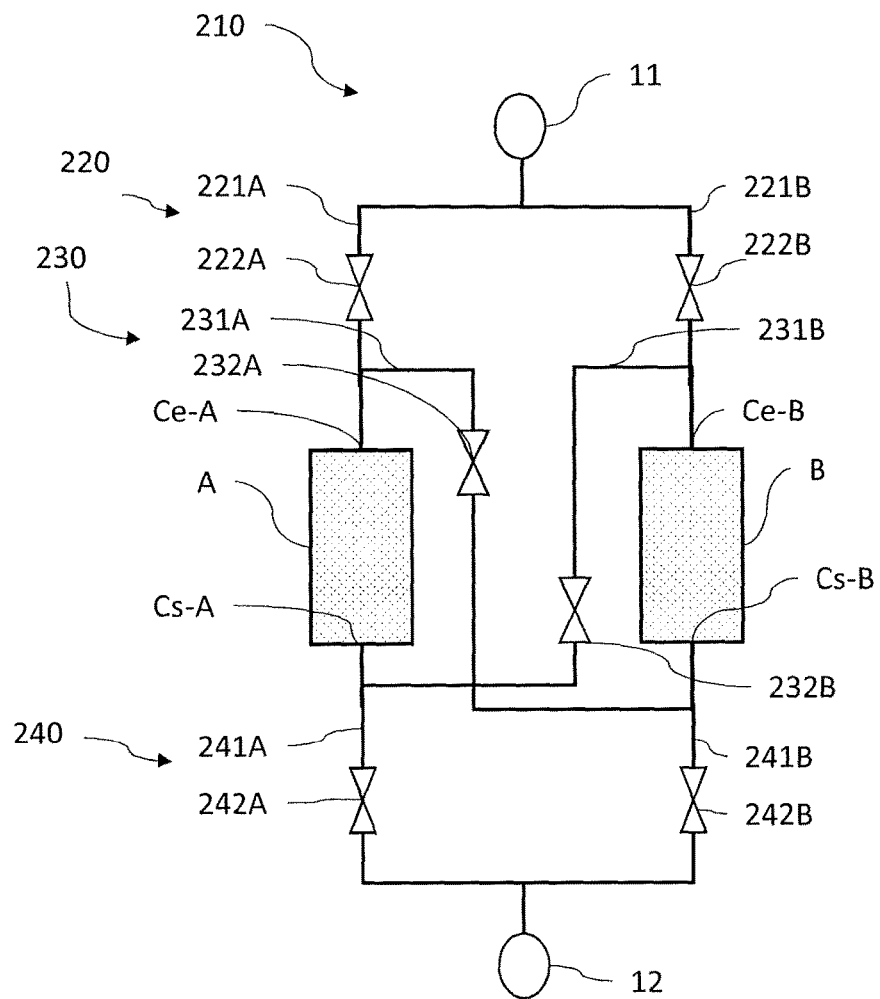
Figure 8A:
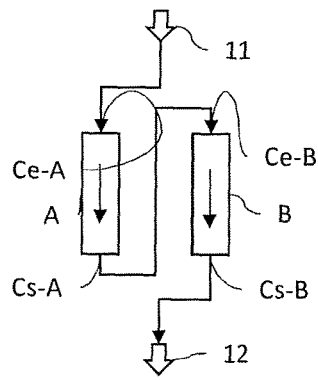
Figure 8B:
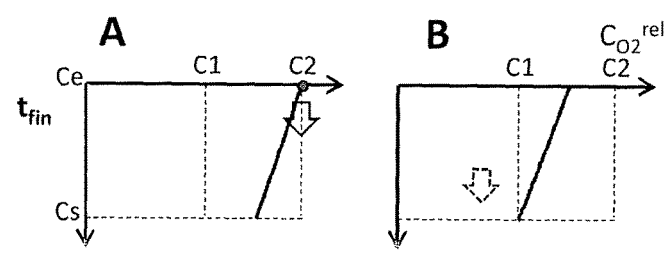
Figure 8C:
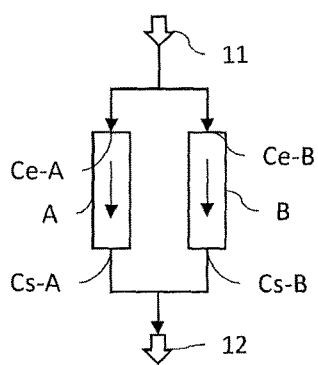
Figure 8D:
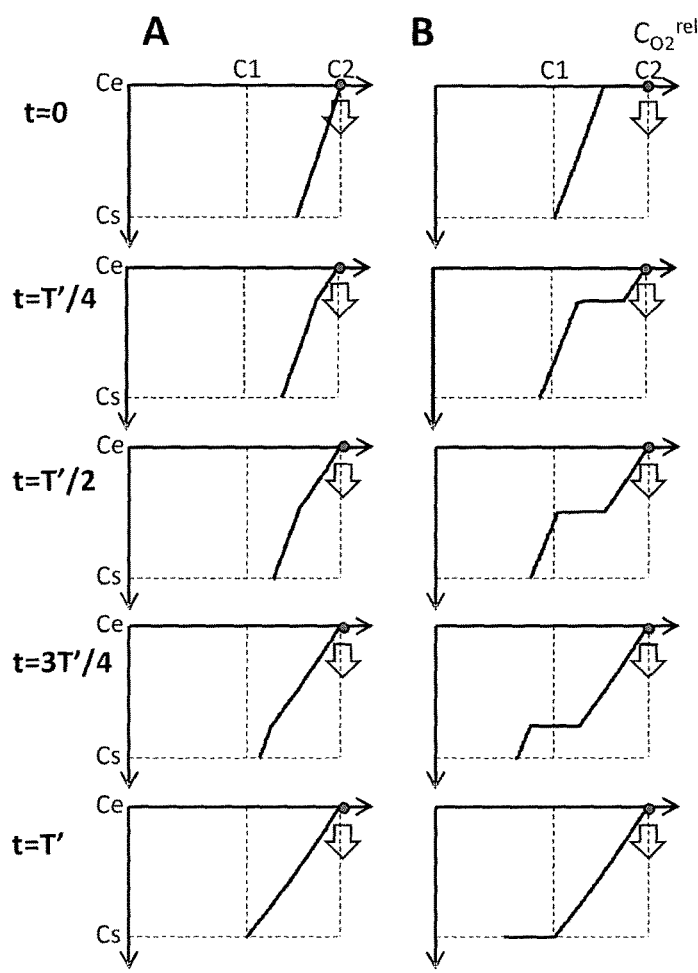
Figure 8E:
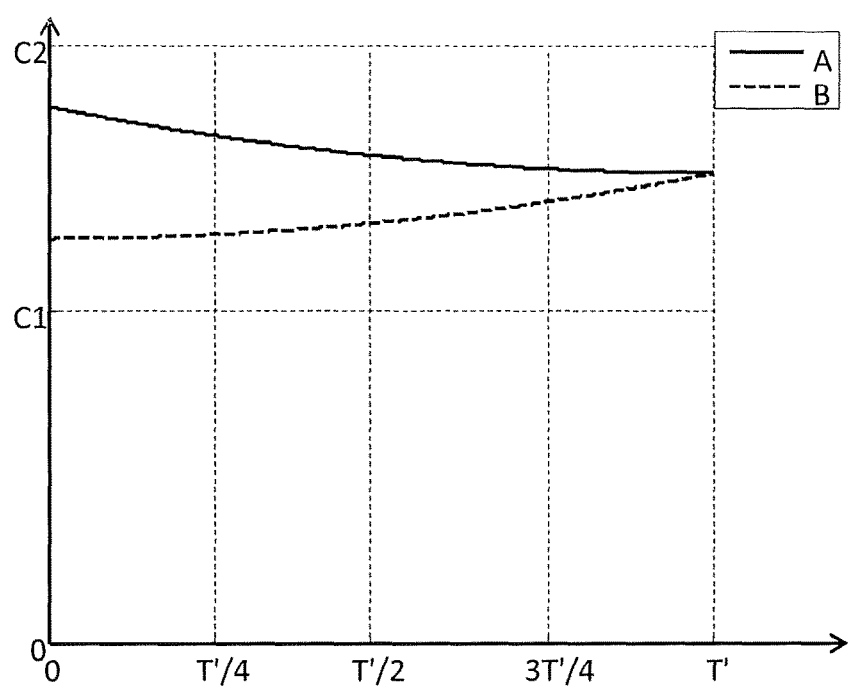
Figure 9A:
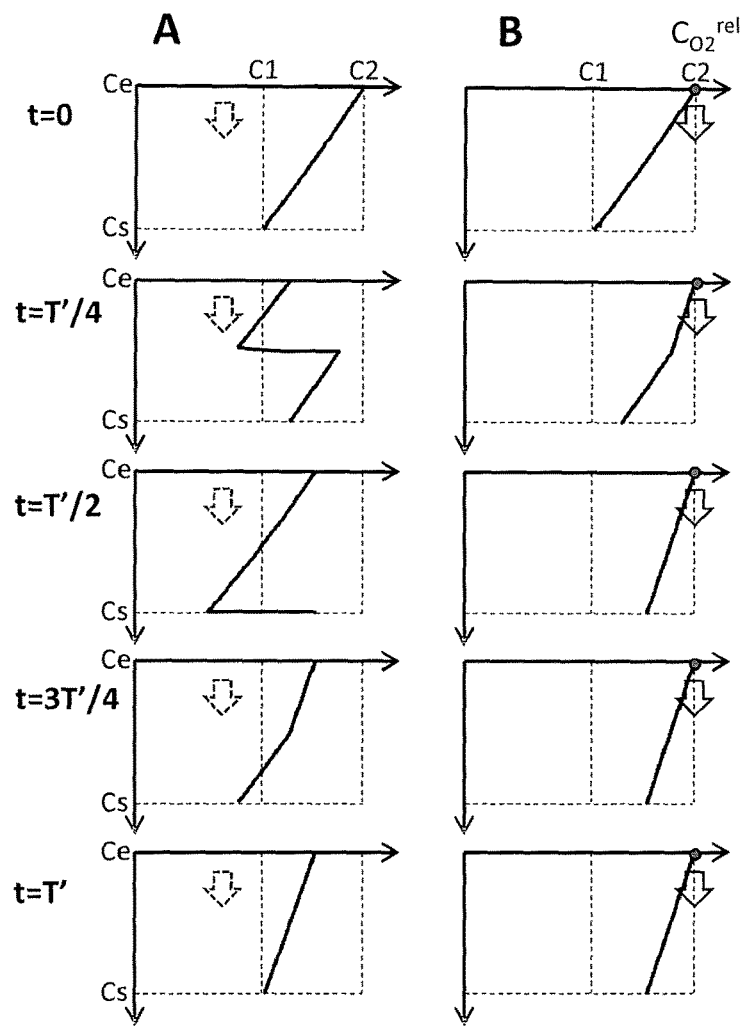
Figure 9B:
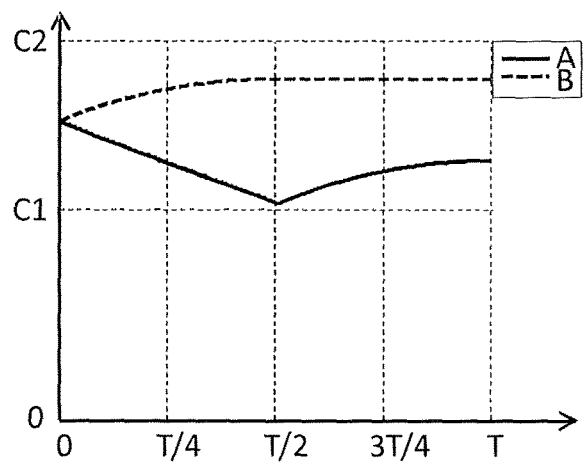
Figure 10A:
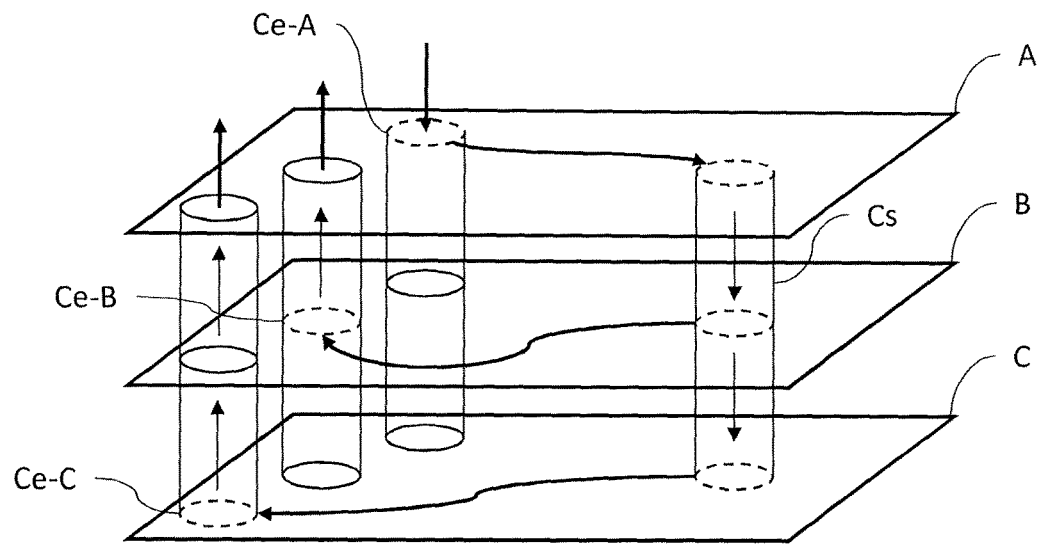
Figure 10B:
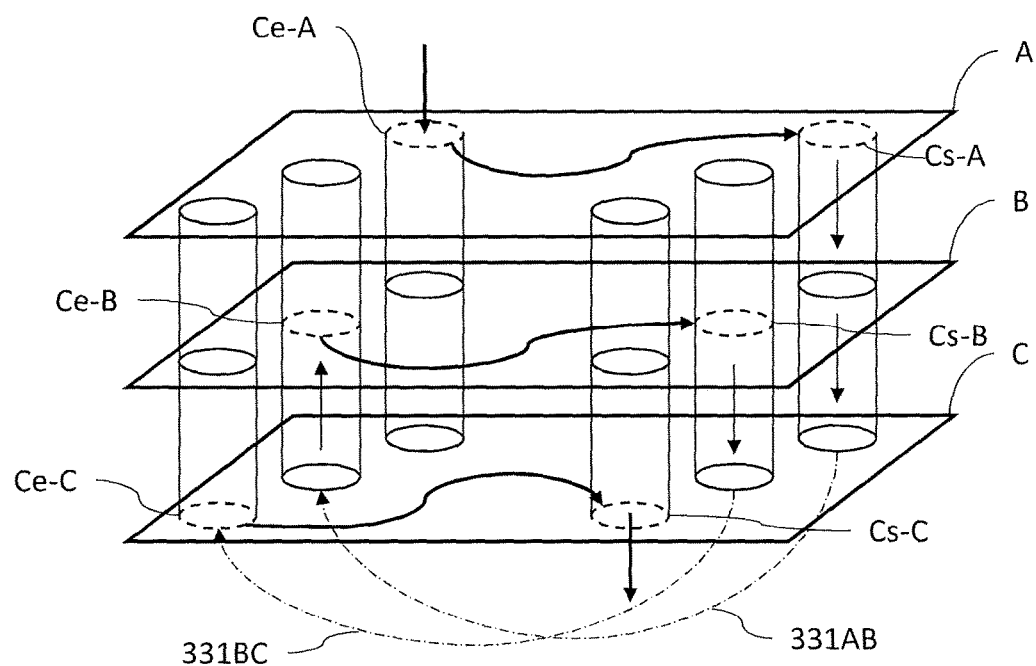

Other aspects, objectives, advantages and features of the invention will be better apparent on reading the following detailed description of preferred embodiments thereof, given by way of nonlimiting example and with reference to the appended drawings in which, besides FIG. 1 already described above:

FIG. 2 is a schematic diagram of a fuel cell according to a first embodiment comprising a stack of electrochemical cells divided into several different groups and comprising an outlet manifold common to all the cells of the stack;

FIG. 3a is a schematic representation of the fuel cell according to the first embodiment during a first supply step; and FIG. 3b is a diagram illustrating the spatial distribution of the molar fraction of reactive species in the groups of the fuel cell illustrated in FIG. 3a, during the first supply step in steady state;

FIG. 3c is a schematic representation of the fuel cell according to the first embodiment during a second supply step directly following the first supply step; FIG. 3d is a diagram illustrating the spatial distribution of the molar fraction of reactive species in the groups of the fuel cell illustrated in FIG. 3c, for various moments of a transient state of the second supply step; and FIG. 3e is a diagram illustrating the change over time of the mean molar fraction of reactive species for each of the groups of the fuel cell during this transient state;

FIG. 4a is a schematic representation of the fuel cell according to the first embodiment during a supply step; and FIG. 4b is a diagram illustrating the spatial distribution of the molar fraction of reactive species in the groups of the fuel cell illustrated in FIG. 4a, during the supply step in steady state;

FIG. 4c is a schematic representation of the fuel cell according to the first embodiment during a purge step directly following the supply step; FIG. 4d is a diagram illustrating the spatial distribution of the molar fraction of reactive species in the groups of the fuel cell illustrated in FIG. 4c, for various moments of a transient state of the purge step; and FIG. 4e is a diagram illustrating the change over time of the mean molar fraction of reactive species for each of the groups of the fuel cell during this transient state;

FIG. 5a is a diagram illustrating the spatial distribution of the molar fraction of reactive species in the groups of a fuel cell illustrated in FIG. 4c, for various moments of a transient state of the purge step, where the stoichiometric coefficient is different for each of the groups; and FIG. 5b is a diagram illustrating the change over time of the mean molar fraction of reactive species for each of the groups of the fuel cell during this transient state;

FIG. 6a is a diagram illustrating the spatial distribution of the molar fraction of reactive species in the groups of the fuel cell, for various moments of a transient state of the supply step following the purge step from FIG. 4c; and FIG. 6b is a diagram illustrating the change over time of the mean molar fraction of reactive species for each of the groups of the fuel cell during this transient state;

FIG. 7 is a schematic diagram of a fuel cell according to a second embodiment comprising a stack of electrochemical cells divided into several different groups, and comprising different outlet manifolds;

FIG. 8a is a schematic representation of the fuel cell according to the second embodiment during a supply step; and FIG. 8b is a diagram illustrating the spatial distribution of the molar fraction of reactive species in the groups of the fuel cell illustrated in FIG. 8a, during the supply step in steady state;

FIG. 8c is a schematic representation of the fuel cell according to the second embodiment during a purge step directly following the supply step; FIG. 8d is a diagram illustrating the spatial distribution of the molar fraction of reactive species in the groups of the fuel cell illustrated in FIG. 8c, for various moments of a transient state of the purge step; and FIG. 8e is a diagram illustrating the change over time of the mean molar fraction of reactive species for each of the groups of the fuel cell during this transient state;

FIG. 9a is a diagram illustrating the spatial distribution of the molar fraction of reactive species in the groups of the fuel cell, for various moments of a transient state of the supply step following the purge step from FIG. 8c; and FIG. 9b is a diagram illustrating the change over time of the mean molar fraction of reactive species for each of the groups of the fuel cell during this transient state;

FIGS. 10a and 10b are schematic views in perspective of a stack of three cells belonging to three different groups, comprising an outlet manifold common to the three groups (FIG. 10a) or different outlet manifolds for the three groups (FIG. 10b).

DETAILED DESCRIPTION OF PARTICULAR EMBODIMENTS

In the Figures and in the remainder of the description the same references represent identical or similar elements. Furthermore, the various elements are not represented to scale, so as to promote the clarity of the Figures.

Various embodiments and variants will be described with reference to a fuel cell, of which the cathode side and/or the anode side of the electrochemical cells is supplied with reactive species diluted in a carrier fluid. The expression "reactive species diluted in a carrier fluid" is understood to mean that the non-reactive and non-condensable species have, in the carrier fluid, a molar fraction substantially greater than 1%, preferably greater than 10% or more. For example, the carrier fluid may be atmospheric air comprising a molar fraction of oxygen of the order of 20% in the non-condensable gas mixture.

In particular, the cathode side of a hydrogen fuel cell supplied with atmospheric air, that is to say containing a molar fraction of oxygen of the order of 20%, will be considered. Other supply examples may also be encompassed by this invention, such as in the case where the anode is supplied from a hydrocarbon reformer. The gas mixture resulting from this reactor and injected into the fuel cell may then contain various gaseous species in addition to hydrogen, such as carbon dioxide, carbon monoxide, nitrogen, in proportions that depend on the hydrocarbon and on the transformation process used. The invention applies to any type of fuel cell, in particular those operating at low temperature, that is to say at a temperature below 200° C.

FIG. 2 illustrates a fuel cell 110 according to a first embodiment. It comprises a stack of electrochemical cells divided into several different groups, here into two groups A and B. The cells are preferably identical to one another and each comprise an anode and a cathode separated from one another by an electrolyte. The cells of the various groups of the same stack may be arranged in an interlocking manner, so that a cell of one group is adjacent to a cell of another group.

Each group A, B of cells comprises an inlet manifold Ce-A, Ce-B suitable for enabling the injection or discharging of fluid into or from the cells of the group in question, and comprises, in this embodiment, an outlet manifold Cs common to all cells of the stack and suitable for enabling the injection or discharging of fluid into or from the cells.

The fuel cell 110 comprises an inlet orifice 11 for supplying the cells with reactive species, and an outlet orifice 12 for discharging fluid out of the cells. The fluid comprising the reactive species injected at the inlet orifice is referred to as supply fluid. In this example, the supply fluid injected at the cathodes of the cells is atmospheric air containing oxygen in a proportion of 20% approximately. At the fuel cell inlet, the stoichiometric oxygen ratio is greater than or equal to 1, so that the amount of oxygen injected is greater than or equal to the amount of oxygen consumed by the cathodes of the fuel cell.

This inlet orifice 11 of the fuel cell is connected, that is to say fluidically connected, to the inlet manifold Ce-A, Ce-B of each of the groups by means of fluidic supply lines 120 suitable for selectively supplying the two groups of cells. In other words, a fluidic communication is possible between the inlet orifice 11 and each inlet manifold Ce-A, Ce-B of the groups. These supply lines 120 comprise pipes 121A, 121B connecting the inlet orifice 11 to the various inlet manifolds Ce-A, Ce-B and comprise at least one selector switch allowing or blocking the flow between the inlet orifice to each of the inlet manifolds Ce-A, Ce-B, and so supplying a first group that is different from one supply step to the next. This selector switch is therefore suitable for supplying a first group that is different from one supply step to the next. In this example, two inlet valves 122A, 122B are provided between the inlet orifice 11 and the inlet manifolds Ce-A, Ce-B.

In the remainder of the description, the expression "selective supply" is understood to mean that the supply lines 120 make it possible to directly supply one or more of the groups with supply fluid, and not the others, the group(s) supplied being different from one supply step to the next, that is to say between two successive supply steps. Moreover, the expression "group of cells supplied, or directly supplied" is understood to mean that the inlet manifold of the group supplied is fluidically connected to the inlet orifice and that supply fluid is introduced into the group in question, without first passing through another group of cells. Furthermore, the expression "fluidic pathway" is understood to mean the pathway of fluidic circulation traveled by the supply fluid in the groups of cells, from a first supplied group to one or more last groups.

The fuel cell also comprises fluidic distribution lines 130 suitable for ensuring the fluidic communication of the groups with one another. In this example, the fluidic distribution lines are formed from the outlet manifold Cs common to each of the groups, so that fluid circulating in one group can flow in the direction of the other group. In FIG. 2, the common outlet manifold Cs is represented by a continuous line joining the two groups.

The fuel cell also comprises a discharge device 140 suitable for enabling the continuous discharging of the supply fluid containing unconsumed reactive species out of the last group(s) not directly supplied to the outlet orifice 12. In this example, the discharge device comprises two discharge pipes 141A, 141B that connect the inlet manifolds Ce-A, Ce-B to the outlet orifice 12, each pipe being provided with a valve 142A, 142B allowing or blocking the flow.

Moreover, the fuel cell 110 comprises purge lines 150 connecting the common outlet manifold Cs to the outlet orifice 12. These purge lines 150 comprise a pipe 151 equipped with a purge valve 152 connecting the outlet manifold Cs to the outlet orifice 12.

The inventors have demonstrated that the supply process described in document WO 2012/152623, when it is applied to the fluidic architecture described above where the fuel cell 110 comprises the discharge device 140, the cells of the fuel cell being supplied with reactive species diluted in a carrier fluid, for example the cathodes of a hydrogen fuel cell being supplied with atmospheric air, may lead to a temporary drop in the voltage or current produced by the fuel cell.

This is in particular the case when two supply steps directly follow one another, that is to say when a second supply step is carried out directly following a first supply step, with no intermediate purge step. Indeed, the inventors have demonstrated that the second supply step begins with a transient phase during which a temporary drop in the voltage or current occurs. It appears that this drop in voltage originates from the temporary formation of a depleted localized zone that has a sudden reduction in the molar fraction of the reactive species.

FIGS. 3a to 3e schematically illustrate the physical phenomenon that leads to the temporary drop in voltage produced by the fuel cell. By way of example, it is considered that the supply fluid is atmospheric air injected by the inlet orifice 11 with a superstoichiometry, or stoichiometric coefficient, equal to 2, that is to say that the molar flow rate of oxygen injected via the inlet orifice 11 is four times greater than the molar flow rate of oxygen consumed along the fluidic pathway by the cathodes of the groups of cells. The molar flow rate of air (excluding water vapour) injected via the inlet orifice 11 is itself approximately five times greater than the molar flow rate of oxygen injected, considering the concentration of oxygen in the atmospheric air (21%).

FIG. 3a is a schematic representation of the fuel cell according to the first embodiment described with reference to FIG. 2, during a first supply step. FIG. 3b is a diagram illustrating the spatial distribution, between the inlet and outlet manifolds of the groups A and B of the fuel cell illustrated in FIG. 3a, of the molar fraction of reactive species during the first supply step and in steady state, that is to say when the spatial distribution of the molar fraction of reactive species along the fluidic pathway no longer varies over time.

With reference to FIGS. 2 and 3a, the group A is supplied with atmospheric air, that is to say that the supply fluid, originating from the inlet orifice 11, is injected into the inlet manifold Ce-A. To do this, the valve 122A is open and the valve 122B is closed. To prevent the fluid from flowing into the discharge pipe 141A, the valve 142A is closed. The fluid flows to the common outlet manifold Cs then, the purge valve 152 being closed, is introduced into the group B and flows to the end of the fluidic pathway, that is to say to the inlet manifold Ce-B. The supply fluid is then discharged to the outlet orifice 12, the valve 142B being open.

With reference to FIG. 3b, in steady state during this supply step, for example at the end $t_{fin}$ of this step, the spatial distribution of the molar fraction of oxygen $c_{O2}^{rel}$ along the fluidic pathway decreases continuously between a maximum value $c_2$ located at the start of the fluidic pathway, that is to say at the manifold Ce-A, down to a minimum value $c_1$ located at the end of the fluidic pathway, that is to say at the manifold Ce-B. The site of the supply is represented by a point located at $c_2$ at Ce-A, and the direction of flow is illustrated by an arrow oriented towards the outlet manifold Cs in group A and towards the inlet manifold Ce-B in group B.

Assuming that the degree of oxygen consumption is identical at any point of the two groups of cells, the spatial change in the molar fraction of oxygen c(x) as a function of the position x along the fluidic pathway follows the equation (1) below, by considering the physical quantities $c_0$, St and n, respectively denoting the molar fraction of oxygen in the air injected (here 0.210), the superstoichiometry ratio (here 2) and the total number of groups of cells passed through (here 2), x varying between 0 (start of the fluidic pathway) and n (end of the fluidic pathway):

$$c(x) = c_0 \frac{St - \frac{x}{n}}{St - \frac{c_0 x}{n}} \quad (1)$$

This equation (1) makes it possible to calculate the molar fraction of oxygen at any point of the flow. Mention will be made of the following values: c(0)=0.210 (inlet of group A); c(0.5)=0.188 (middle of group A); c(1)=0.166 (outlet of group A and inlet of group B); c(1.5)=0.142 (middle of group B); c(2)=0.117 (outlet of group B).

Thus, in this example, the value $c_2$ is equal to 0.210 and the value $c_1$ is equal to 0.117. The spatial distribution follows here, purely by way of illustration, a virtually linear change obtained with the aid of equation (1), corresponding to an identical rate of oxygen consumption at any point of the cells, but other changes are possible. Furthermore, a step of supplying group A has been illustrated, but the situation is similar when the supply step relates to group B.

FIG. 3c is a schematic representation of the fuel cell according to the first embodiment described with reference to FIG. 2, during a second supply step directly following the first step from FIG. 3a. FIG. 3d is a diagram illustrating the spatial distribution, between the inlet and outlet manifolds of the groups A and B of the fuel cell illustrated in FIG. 3c, of the molar fraction of reactive species for various moments of a transient state of the second supply step.

With reference to FIGS. 2 and 3c, the supply is reversed relative to the preceding supply step. More specifically, the group B is now supplied with atmospheric air, that is to say that the supply fluid, originating from the inlet orifice 11, is injected into the inlet manifold Ce-B. To do this, the valve 122B is open and the valve 122A is closed. To prevent the fluid from flowing into the discharge pipe 141B, the valve 142B is closed. The fluid flows to the common outlet manifold Cs then, the purge valve 152 being closed, is introduced into the group A and flows to the end of the fluidic pathway, that is to say to the inlet manifold Ce-A. The supply fluid is then discharged to the outlet orifice 12, through the discharge pipe 141A, the valve 142A being open.

With reference to FIG. 3d, the second supply step begins with a transient state, of a time T, in which the spatial distribution of the molar fraction of oxygen $c_{O2}^{rel}$ varies over time until a steady state is established (starting from t≥T). In the various diagrams obtained with the aid of a simulation of the oxygen consumption in the gas flow as a function of time, the site of the supply is represented by a point located at $c_2$ at Ce-B, and the direction of flow is illustrated by an arrow oriented towards the outlet manifold Cs in group B and towards the inlet manifold Ce-A in group A.

At the start of the second supply step (FIG. 3d, t=0), the spatial distribution of the molar fraction of oxygen along the fluidic pathway is identical to that at the end of the first supply step (FIG. 3b), that is to say that the molar fraction of oxygen at Ce-B is 0.117. During this new supply step, atmospheric air is injected directly at the manifold Ce-B, which results in a new value $c_2$ of the molar fraction of oxygen at Ce-B of 0.210. Thus a localized zone P appears that has a sudden reduction in the molar fraction of oxygen, here of the order of 50%. The depleted air located in this zone P has already passed through the two groups of cells A and B a first time. Considering the change in the direction of the flow, this zone P will pass back through the two groups A and B a second time in the course of this transient phase. Downstream of the flow, the molar fraction of oxygen continuously increases, following the initial profile, up to the value $c_2$ at the manifold Ce-A of group A.

At a subsequent moment of the second supply step (FIG. 3d, t=T/4), due to the supplying of group B, the depleted localized zone P has migrated along the fluidic pathway and is located approximately at the midway point of the cells of group B. The depleted air located in this zone P passes through the group B and the consumption of oxygen in the cells further accentuates the oxygen depletion. Thus, on arrival at the halfway point of this passage, the minimum molar fraction of oxygen in this zone P has decreased and is equal to 0.093. Downstream of the flow, the molar fraction of oxygen continuously increases, following an approximately initial profile, having lower values however, due to the consumption of oxygen.

At a subsequent moment of the second supply step (FIG. 3d, t=T/2), the depleted localized zone P has again migrated along the fluidic pathway and is located approximately at the common outlet manifold Cs. The minimum value of the molar fraction in the zone P has again decreased and here is of the order of 0.068.

At a subsequent moment of the second supply step (FIG. 3d, t=3T/4), the depleted localized zone P has again migrated along the fluidic pathway in the direction of the inlet manifold Ce-A of group A, and is now located approximately at the halfway point of group A. The steady state is achieved in the group B supplied, that is to say that the spatial distribution of the molar fraction of oxygen in the group B no longer changes substantially over time. However, the transient state is not finished in the fuel cell in so far as the depleted zone P is now located in the group A. The minimum value of the molar fraction of oxygen in the zone P has decreased and here is of the order of 0.041. Moreover, in so far as the value of the molar fraction of oxygen at the end of the fluidic pathway (at the manifold Ce-A) decreases due to the consumption of oxygen in group A, a relatively extensive oxygen-depleted zone P' is formed, which extends from the zone P to the manifold Ce-A.

At a subsequent moment of the second supply step (FIG. 3d, t=T), the depleted localized zone P has reached the end of the fluidic pathway, that is to say here the inlet manifold Ce-A of group A. The transient state is substantially finished and the steady state begins in the fuel cell. However, the minimum value of the molar fraction of oxygen in the zone P is here very low, of the order of 0.015.

FIG. 3e represents the change over time of the mean molar fraction of oxygen throughout the duration of the transient phase illustrated in FIG. 3d, from t=0 to t=T, for each of the groups A, B of cells. In group B, the mean molar fraction always remains between the two extreme values encountered in steady state, namely 0.142 and 0.188. This corresponds to a small drop in performance of this group of cells during the transient phase. On the other hand, in group A, the mean molar fraction of oxygen is less than 0.142 over three quarters of the transient phase, passing through minimum at 0.096. The drop in performance is then substantial for this group of cells.

Thus, during the transient state of time T, all the cells of the groups are traveled through by a localized zone P having a substantial drop in the molar fraction of reactive species. The fuel cell therefore has a drop in the voltage or the current produced over a time T at the beginning of each new supply step directly following a supply step. This temporary drop in the voltage or the current is particularly large in the group of cells A, where the mean molar fraction of oxygen passes through minimum value much lower than the value observed in steady-state operation. This drop may disrupt the operation of certain elements of the electrical control system of the fuel cell, for example the power electronics. Indeed, the converters, often connected to the terminals of high-powered fuel cells, will have to tolerate a larger input voltage range, which will necessitate an oversizing of this equipment, having damaging consequences in terms of cost and space requirement of the system. This zone of high electrochemical inhomogeneity has an impact on all the cells of the groups of the fuel cell, which may lead to a degradation of the electrochemical properties thereof, especially when the molar fraction of reactive species locally becomes low.

In order to limit the drop in molar fraction, in particular that obtained locally in the zones P and P', it may be envisaged to temporarily increase the supply flow rate during the transient phase, so as to increase the superstoichiometry temporarily. This measure is effective, in the sense that the minimum value of the molar fraction of oxygen in the zone P may pass, for example, from 0.015 to 0.039, whilst the mean molar fraction in group A does not drop below 0.106 instead of 0.096. On the other hand, the implementation of this rapid and brief increase in flow rate complicates the supply device of the fuel cell (comprising for example an air compressor) and also the control thereof. In any case, this measure could also be implemented in the invention.

For the purpose of limiting the electrochemical impact of the supply process described in document WO 2012/152623 applied to the fluidic architecture described above and to a supplying of the cells with reactive species diluted in a carrier fluid, the supply process according to the invention comprises, after each supply step, a step of purging all the groups of cells.

More specifically, the supply process according to the invention comprises a plurality of steps of selectively supplying the N groups of cells with reactive species, during which a first group of cells is supplied. The reactive species not consumed in the first group circulates in the other groups by means of the distribution lines 130 that ensure the fluidic communication of the groups with one another in so far as they are arranged so as to form, with the N groups, a fluidic pathway for the reactive species, going from the first group supplied to one or more last groups forming the end of the fluidic pathway. From one supply step to the next, that is to say between two successive supply steps, the first group supplied is different, and optionally the last group(s). Following each of the supply steps, a step of purging the N groups of cells is carried out during which each of the groups is simultaneously supplied with reactive species. Each group then communicates with the outlet orifice 12 of the fuel cell in order to enable the fluidic discharging of the N groups of cells.

Thus, unlike the process according to the prior art mentioned above, in which a plurality of selective supply steps are carried out successively before carrying out a step of purging all the groups of cells, a purge step is carried out here after each selective supply step. In other words, between two successive selective supply steps, a step of purging the groups of cells is carried out. The process for supplying the fuel cell according to the invention makes it possible to limit its impact on the electrical or electrochemical performance and/or properties of the fuel cell.

FIGS. 4a to 4e schematically illustrate the change over time of the spatial distribution of the molar fraction of reactive species along the fluidic pathway between a supply step followed by a purge step. Here too, and only by way of example, it is considered that the supply fluid is atmospheric air injected via the inlet orifice 11 with a superstoichiometry equal to 2, that is to say that the molar flow rate of oxygen injected via the inlet orifice 11 is four times greater than the molar flow rate of oxygen consumed along the fluidic pathway by the cathodes in the groups of cells. The molar flow rate of air (excluding water vapour) injected via the inlet orifice 11 is itself approximately five times greater than the molar flow rate of oxygen injected, considering the concentration of oxygen in the atmospheric air (21%).

FIG. 4a is a schematic representation of the fuel cell according to the first embodiment described with reference to FIG. 2, during a supply step. FIG. 4b is a diagram illustrating the spatial distribution, between the inlet and outlet manifolds of the groups A and B of the fuel cell illustrated in FIG. 4a, of the molar fraction of reactive species $c_{O2}^{rel}$ during the supply step in steady state, that is to say when the spatial distribution of the molar fraction of reactive species along the fluidic pathway no longer varies over time.

The supply conditions are identical to those of FIG. 3a and result in a spatial distribution of the molar fraction of oxygen identical to that of FIG. 3b. These Figures are not therefore described further. The spatial distribution follows here, purely by way of illustration, a linear change, but other changes are possible. Furthermore, a step of supplying group A has been illustrated, but the situation is similar when the supply step relates to group B.

FIG. 4c is a schematic representation of the fuel cell according to the first embodiment described with reference to FIG. 2, during a purge step directly following the supply step from FIG. 4a. FIG. 4d is a diagram illustrating the spatial distribution, between the inlet and outlet manifolds of the groups A and B of the fuel cell illustrated in FIG. 4c, of the molar fraction of reactive species for various moments of a transient state of the purge step.

With reference to FIGS. 2 and 4c, the two groups are both supplied simultaneously with reactive species from the inlet orifice 11. Thus, group A remains supplied with respect to the previous supply step, and group B is also supplied with reactive species. Thus, the supply fluid, originating from the inlet orifice 11, is simultaneously injected into the inlet manifolds Ce-A and Ce-B, the valves 122A and 122B being open and the discharge valves 142A and 142B being closed. The fluid flows into the cells of each of the groups down to the common outlet manifold Cs then is discharged to the outlet orifice 12 through the purge pipe 151, the valve 152 being open. It should however be noted that since the two groups are supplied at the same time, the molar flow rate of the supply fluid at the inlet orifice 11 during the purge step may remain constant or be increased relative to its value during the previous supply step. By way of example, detailed in the diagrams of FIG. 4d is the case where the molar flow rate of the supply fluid at the inlet orifice 11 is substantially equal to what it was during the previous supply step.

With reference to FIG. 4d, the purge step begins with a transient state, of a time T', in which the spatial distribution of the molar fraction of oxygen varies over time until a steady state is established (starting from $t \geq T'$). In the various diagrams, the site of the supply is represented by two points, located at $c_2$ at Ce-A and at Ce-B, and the direction of flow is illustrated by an arrow oriented towards the outlet manifold Cs in the groups A and B.

At the start of the purge step (FIG. 4d, t=0), the spatial distribution of the molar fraction of oxygen along the fluidic pathway is identical to what it was at the end of the supply step (FIG. 4b), that is to say that the molar fraction of oxygen at Ce-A is 0.210 whereas it is, at Ce-B, 0.117. During this purge step, the sum of the molar flow rates at the inlet manifolds Ce-A and Ce-B is equal to the molar flow rate of air injected at the orifice 11 during the previous step. Taking the example of a balanced distribution of the flow between the two groups of cells, the supply of air at the inlet of each group of cells always corresponds to a superstoichiometry of 2. This simultaneous supplying of groups A and B leads to an identical $c_2$ value at the manifold Ce-A but to a new $c_2$ value at the manifold Ce-B of 0.210. Therefore, in group B only, a localized zone P appears that has a sudden reduction, here of the order of 50%, in the molar fraction of oxygen. Downstream of the flow, in group B, the molar fraction of oxygen increases continuously, following the initial profile, up to the common outlet manifold Cs, whereas it decreases continuously, in group A, up to the manifold Cs.

In group A, the spatial distribution of the molar fraction of oxygen is gradually established, between the new $c_2$ value of the order of 0.21 upstream of the flow, at the manifold Ce-A, to the $c_1$ value downstream of the flow, at the manifold Cs, $c_1$ being approximately of the order of 0.117. The calculation of the profile of molar fraction of oxygen in steady state may be calculated with the aid of equation (1), by taking n=1 and by varying x between 0 and 1. The transient state lasts of the order of T'. No sudden drop in the molar fraction is observed in group A; only an inflection point is visible on the profiles represented in FIG. 4d. The molar fraction always keeps a value greater than or equal to $c_1$, and the mean molar fraction for the group A decreases monotonically while keeping a high value (from 0.188 to 0.166).

In group B, at a subsequent moment of the purge step (FIG. 4d, t=T'/4), the new profile is gradually established. The depleted localized zone P has migrated along the fluidic pathway and is located approximately at the first quarter of the cells of group B. Due to the consumption of oxygen by the cells of the groups during the electrochemical reaction, the minimum value of the molar fraction in the zone P has decreased and here is of the order of 0.093.

At a subsequent moment of the purge step (FIG. 4d, t=T'/2), the depleted localized zone P has again migrated along the fluidic pathway and is located approximately at the middle of the cells of group B. The minimum value of the molar fraction in the zone P has decreased and here is of the order of 0.069.

At a subsequent moment of the purge step (FIG. 4d, t=3T'/4), the depleted localized zone P has migrated along the fluidic pathway and is now approximately at the last quarter of the cells of group B. The minimum value of the molar fraction in the zone P has decreased and here is of the order of 0.041. As the value of the molar fraction of oxygen at the end of the fluidic pathway (at the manifold Cs-B) decreases due to the consumption of oxygen in group B, a relatively extensive oxygen-depleted zone P' is formed, which extends from the zone P to the manifold Cs-B. Nevertheless, compared to the zone P' observed in the previous case (FIG. 3d), the molar fraction at the outlet manifold is significantly higher here.

At a subsequent moment of the second supply step (FIG. 4d, t=T'), the depleted localized zone P has reached the end of the cells of group B, that is to say here the inlet manifold Cs. The transient state is substantially finished and the steady state begins in the fuel cell. The minimum value of the molar fraction of oxygen in the zone P here is of the order of 0.017, and, once this zone is discharged, the minimum value of the molar fraction in group B will be approximately 0.117, just as at the end of group A.

FIG. 4e represents the change over time of the mean molar fraction of oxygen throughout the duration of the transient phase illustrated in FIG. 4d, from t=0 to t=T', for each of the groups A, B of cells. In group B, throughout the duration of the transient phase a moderate drop in the mean molar fraction of oxygen appears. Less than 0.142 between t=0 and t=3T'/4, the mean molar fraction passes through minimum at 0.134. This indicates that the presence of the zones P and P' in the flow has only a limited impact on the overall level. The drop in performance will thus be more moderate for this group of cells than that seen by group A in the previous case.

By temporarily increasing the superstoichiometry of the fuel cell to a value, for example, of 2.5 instead of 2, the minimum value of the molar fraction changes from 0.017 to 0.040, and the minimum mean molar fraction changes from 0.134 to 0.139. A positive effect of the increase in the superstoichiometry in the transient phase is found here.

Thus, by systematically carrying out a step of purging the groups of cells between two successive selective supply steps, the impact of the depleted localized zone, which migrates this time along a single group of cells, is limited.

Thus, the amplitude of the drop in voltage or current produced by the fuel cell during the transient state is reduced. Moreover, the depleted zone affects a limited number of groups of cells and no longer all the groups of cells. The process according to the invention thus makes it possible to limit the temporary drop in voltage or current produced by the fuel cell.

As a variant, and advantageously, during the purge step, the molar flow rate of reactive species at the inlet of the groups of cells may be different between at least two of said groups. Preferably, the molar flow rate of reactive species at the inlet of one group of cells, this group being a last group during the previous supply step, is greater than that of at least one other group. Thus, the groups A, B of cells may be supplied separately during the purge step, for example by modifying the value of the molar flow rate of oxygen at the valves 122A and 122B (FIG. 2). Thus, by differing the inlet molar flow rates, a different superstoichiometry is temporarily applied to group A and to group B. By way of example, instead of applying a superstoichiometry of 2 at the inlet of groups A and B, a superstoichiometry of 1.5 is applied at the inlet of group A and of 2.5 at the inlet of group B, only for a time T''. In any case, the overall superstoichiometry applied to the assembly of the two groups of cells remains equal to 2. This may be easily implemented for example by causing a temporary flow restriction in the supply pipe 121A of group A. The pressure drop brought about could be designed to generate the decrease in the supply flow rate of group A corresponding to the desired drop in superstoichiometry, accompanied by a corresponding increase for the supply flow rate and the superstoichiometry at the inlet of group B.

FIGS. 5a and 5b illustrate this transient phase, which takes place here in two stages. Firstly, over a time T'', a sudden drop in the molar fraction of oxygen appears in the profile of molar fraction at the inlet of group B (Ce-B) at t=0, and moves to the outlet of the group (Cs), at t=T''. As in the previous case, a zone P is present with a minimum value of the molar fraction decreasing as it passes through group B. But here, since the flow rate for supplying air is greater than before, the drop in molar fraction is smaller, as attested to by the slope of the change in molar fraction upstream of the zone P, visible at t=T''/2. This slope is not as great as that observed in FIG. 4d, between t=T'/4 and t=3T'/4, due to the higher superstoichiometry. Therefore, the minimum value of molar fraction in group B in FIG. 5a, obtained in the zone P at t=T'', is significantly higher than before, at 0.037 instead of 0.017. Moreover, there is no longer a zone P' here between the zone P and the outlet of the group Cs, since the drop in molar fraction is smaller here than before.

During this first part of the transient phase, the change in the molar fraction of oxygen in group A is similar to that observed in the previous case, with a profile having an inflection point, separating two zones of different slopes (FIG. 5a, t=0 to t=T''): starting from the inlet Ce-A, the slope corresponds firstly to a superstoichiometry of 1.5 (the one applied during this phase), then corresponds to a superstoichiometry of 4 (the one applied during the previous supply step). Like zone P for group B, the inflection point in group A moves from the inlet Ce-A towards the outlet Cs. At the end of the time T'', this inflection point has not yet reached the outlet Cs since the flow rate for supplying the group A is lower than that of group B.

Starting from t=T'', the second part of the transient phase begins. The supply of the two groups is modified, with a re-establishment of identical supply conditions for both groups. In other words, the superstoichiometry becomes equal to 2 for group A and for group B. The duration of this second part is equal to T', like in the previous case where the superstoichiometry of each group was also set at 2. Firstly, three zones are seen to appear in group A, each having a different slope in the change in the molar fraction of oxygen, and separated by an inflection point (clearly visible in FIG. 5a, t=T"+T'/4). From the inlet Ce-A to the first inflection point, the slope is that corresponding to a superstoichiometry of 2, that is to say the value imposed during the current purge phase. Downstream of this inflection point and up to the next inflection point, the slope corresponds to the superstoichiometry imposed during the first part of this purge phase, that is to say 1.5. Finally, downstream of the second inflection point, the slope corresponds to the superstoichiometry applied before the transient phase, during the supply step, that is to say 4.

In group B, a single inflection point appears (visible at t=T"+T/4), located at the same distance from Ce as in group A. Upstream of this inflection point, the slope of the change in the molar fraction of oxygen corresponds to a superstoichiometry of 2, like in group A. Downstream of this inflection point and up to the outlet Cs, the slope is uniform and corresponds to the superstoichiometry applied during the first part of this transient phase, that is to say 2.5.

Due to the entrainment of the fluid from the inlet Ce towards the outlet Cs in both groups of cells, the inflection points are entrained towards the outlet, then disappear. At the end of the time T' of this second part of the transient phase, that is to say at t=T"+T', the concentration profile in each of the two groups is established.

The change in the mean molar fraction of oxygen in each group during the transient phase, represented in FIG. 5b, shows that the reduction in this physical quantity in group B is both smaller (minimum 0.139 instead of 0.134, starting from a value of 0.142), and less present over time (duration of T"/2, instead of 3T'/4, i.e. approximately a reduction by a factor 2, with T'~1.4T" here). The maintaining of the molar fractions of oxygen at high values, and the absence of zone P' in the flow makes it possible to guarantee a good performance of this fuel cell during the transient phase, and to prevent the appearance of local conditions that are detrimental to the service life of the cells.

A temporary increase in the superstoichiometry during the transient phase may be envisaged here as in the other cases. By considering an overall superstoichiometry of 2.5, the superstoichiometries to be applied to group A and to group B may for example be set respectively at 2 and 3. The effect of this measurement is particularly positive, since the minimum value of the molar fraction in group B changes from 0.037 to 0.052, and since the minimum observed in the change in the mean molar fraction for group B differs only negligibly with the value at the start of the transient phase.

With reference to FIGS. 6a and 6b, the supply process continues with another selective supply step during which a first group is directly supplied, this group being different from that of the previous supply step, and the last group, located at the end of the fluidic pathway, is also different from that of the previous supply step.

It is observed that, during the following supply step, the flow direction at the first group supplied is advantageously identical to the flow direction that occurred in this same group during the previous purge step. More specifically, here, in group B, the flow direction during the purge step goes from the manifold Ce-B towards the manifold Cs. During the following supply step, since group B becomes the first group supplied, the flow direction is then identical. Thus, there is no inversion of the profile of spatial distribution of the molar fraction of reactive species, which limits the formation of a new depleted zone migrating along the fluidic pathway.

The spatial change in the profile of molar fraction in both groups of cells during the passage from the purge step to the following supply step is represented in FIG. 6a, where group B is supplied and where the fluidic pathway corresponds to the configuration of the fuel cell as represented in FIG. 3c. As FIG. 6a shows, the transient phase of time T does not reveal a discontinuity in the profile of molar fraction of reactive species in the groups of cells A and B. Two inflection points appear and move along the flow pathway. The minimum is obtained for the fluid located at Cs at t=0, which then passes through group A until t=T/2. It is at this instant that the lowest value is observed for the local molar fraction, with a value of the order of 0.069, located at the manifold Ce-A.

With reference to FIG. 6b, the mean molar fraction of oxygen is identical in each group of cells at the moment t=0. It then drops for group A, but never drops below 0.113. This value remains relatively high, very close to the value $c_1$, which guarantees that the drop in performance observed, in particular between t=T/4 and t=T/2, will remain limited.

In addition, as will be described in detail further on, it may be advantageous for the flow direction in each of the groups of cells to remain identical, from a supply step to a following purge step and vice versa.

FIG. 7 illustrates a fuel cell 110 according to a second embodiment. It differs essentially from the fuel cell according to the first embodiment in that the distribution lines 230 and the discharge device 240 are arranged so that the direction of circulation of the supply fluid in the groups can be co-current from one group to the next, that is to say identical, thus making it possible to obtain an identical flow direction, from a supply step to a following purge step and vice versa.

In this example, each group of cells comprises an inlet manifold Ce-A, Ce-B and an outlet manifold Cs-A, Cs-B that are different. Supply lines 220 comprise pipes 221A, 221B connecting the inlet orifice 11 to the inlet manifolds Ce-A, Ce-B and comprise at least one selector switch allowing or blocking the flow between the inlet orifice to each of the inlet manifolds, and so supplying a different first group from one supply step to the next. This selector switch is therefore suitable for supplying a different first group from one supply step to the next. In this example, two inlet valves 222A, 222B are provided between the inlet orifice 11 and the inlet manifolds Ce-A, Ce-B.

The fuel cell 210 also comprises fluidic distribution lines 230 suitable for ensuring the fluidic communication of the groups with one another. In this example, since the outlet manifolds Cs-A, Cs-B are different from one another, the fluidic distribution lines comprise two distribution pipes 231A, 231B arranged to connect the outlet manifold Cs-B, Cs-A of one group to the inlet manifold Ce-A, Ce-B of the neighbouring group, and vice versa, so that fluid circulating in one group can flow in the direction of the second group. Each distribution pipe 231A, 231B is equipped with a valve 232A, 232B allowing or blocking the fluidic flow in the pipe.

The fuel cell comprises a discharge device 240 connecting at least a last group of the fluidic pathway to the outlet orifice 12 and suitable for ensuring the continuous discharging of fluid present in this group when another group is supplied. In this example, the discharge device 240 connects the outlet manifold Cs-A of group A to the outlet orifice 12 via a discharge pipe 241A here equipped with a valve 242A, and also the outlet manifold Cs-B of group B to the outlet orifice 12 via a discharge pipe 241B here equipped with a valve 242B. In this example, the discharge device is suitable here for purging the fuel cell.

FIGS. 8a to 8e schematically illustrate the change over time of the spatial distribution of the molar fraction of reactive species along the fluidic pathway between a supply step followed by a purge step, in the fuel cell described with reference to FIG. 7. Here too, and only by way of example, it is considered that the supply fluid is atmospheric air injected via the inlet orifice 11 with a superstoichiometry equal to 2, that is to say that the molar flow rate of oxygen injected via the inlet orifice 11 is four times greater than the molar flow rate of oxygen consumed by the cathodes in each group of cells. The molar flow rate of air (excluding water vapour) injected via the inlet orifice 11 is itself approximately five times greater than the molar flow rate of oxygen injected, considering the concentration of oxygen in the atmospheric air (21%).

FIG. 8a is a schematic representation of the fuel cell according to the second embodiment described with reference to FIG. 7, during a supply step. FIG. 8b is a diagram illustrating the spatial distribution along the fluidic pathway, between the inlet and outlet manifolds of the groups A and B of the fuel cell illustrated in FIG. 8a, of the molar fraction of reactive species during the supply step in steady state, that is to say when the spatial distribution of the molar fraction of reactive species along the fluidic pathway no longer varies over time.

Unlike FIG. 4a, the flow direction in group A is identical to that in group B, that is to say that the supply fluid is injected from the inlet orifice 11 into group A from the manifold Ce-A, the valve 222A being open and the valve 222B being closed, as well as the distribution valve 232A, then flows to the manifold Cs-A, then, valve 242A being closed and valve 232B being open, is carried to the inlet manifold Ce-B of group B then flows to the outlet manifold Cs-B, and is discharged to the outlet orifice 12, the valve 242B being open. This leads to a spatial distribution of the molar fraction of oxygen that decreases continuously along the fluidic pathway, starting from a maximum value $c_2$, here of the order of 0.210 at the manifold Ce-A down to a minimum value $c_1$ here of the order of 0.117 at the manifold Cs-B located at the end of the fluidic pathway. The spatial distribution follows here, purely by way of illustration, a linear change, but other changes are possible. Furthermore, a step of supplying group A has been illustrated, but the situation is similar when the supply step relates to group B.

FIG. 8c is a schematic representation of the fuel cell according to the second embodiment described with reference to FIG. 7, during a purge step directly following the supply step from FIG. 8a. FIG. 8d is a diagram illustrating the spatial distribution of the molar fraction of reactive species along the fluidic pathway, between the inlet and outlet manifolds of the groups A and B of the fuel cell illustrated in FIG. 8c, for various moments of a transient state of the purge step.

With reference to FIG. 8c, the two groups are both supplied simultaneously with reactive species from the inlet orifice 11, and the flow direction in each of the groups is identical to that which took place during the previous supply step. Group A remains supplied with respect to the previous supply step, and group B is also supplied with reactive species. Thus, the supply fluid, originating from the inlet orifice 11, is simultaneously injected into the inlet manifolds Ce-A and Ce-B, the valves 222A and 222B being open and the valves 232A and 232B being closed. The fluid flows into the cells of each of the groups down to the common outlet manifold Cs then is discharged to the outlet orifice 12, the valves 242A and 242B being open. It should however be noted that since the two groups are supplied at the same time, the molar flow rate of the supply fluid at the inlet orifice 11 may remain constant or be increased relative to its value during the previous supply step. By way of example, detailed in the diagrams of FIG. 6d is the case where the molar flow rate of the supply fluid at the inlet orifice 11 is substantially equal to what it was during the previous supply step.

With reference to FIG. 8d, the purge step begins with a transient state, of a time T', in which the spatial distribution of the molar fraction of oxygen varies over time until a steady state is established (starting from $t \geq T'$). In the various diagrams, the site of the supply is represented by two points, located at $c_2$ at Ce-A and at Ce-B, and the direction of flow is illustrated by an arrow oriented towards the outlet manifolds Cs-A and Cs-B in the groups A and B.

At the start of the purge step (FIG. 8d, t=0), the spatial distribution along the fluidic pathway of the molar fraction of oxygen is identical to what it was at the end of the supply step (FIG. 8b), that is to say that the molar fraction of oxygen at Ce-A is 0.210 whereas it is, at Ce-B, 0.166. During this purge step, the molar flow rate at the inlet manifolds Ce-A and Ce-B corresponds to a superstoichiometry equal to 2, that is to say that the molar flow rate of oxygen injected via the inlet orifice 11 is four times greater than the molar flow rate of oxygen consumed by the cathodes in each group of cells. The molar flow rate of oxygen injected at the inlet manifolds of each group is equal to half of that injected via the inlet orifice 11, which leads to an identical $c_2$ value at the manifold Ce-A but to a new $c_2$ value at the manifold Ce-B of 0.210.

In group A, the spatial distribution of the molar fraction of oxygen is established gradually (FIG. 8d, from t=0 to t=T'), between the new $c_2$ value of the order of 0.210 upstream of the flow, at the manifold Ce-A, to the $c_1$ value downstream of the flow, at the outlet manifold Cs-A, $c_1$ being of the order of 0.117. The transient state lasts of the order of T'. Only one inflection point in the curve of spatial change in the molar fraction is visible. The latter moves gradually from the manifold Ce-A to the manifold Cs-A. The molar fraction of oxygen at the outlet of group A changes gradually from 0.166 to the $c_1$ value.

In group B too, the spatial distribution of the molar fraction of oxygen is established gradually (FIG. 8d, from t=0 to t=T'), between the new $c_2$ value of the order of 0.210 upstream of the flow, at the manifold Ce-B, to the $c_1$ value downstream of the flow, at the outlet manifold Cs-B, $c_1$ being of the order of 0.117. The existence of a zone having a localized variation of the molar fraction is noted here. Thus, unlike the purge step described with reference to FIG. 4d in which a depleted localized zone P was generated, here the zone has only a small localized variation of the molar fraction, much lower than the relative drop of 50% described with reference to FIG. 4d.

FIG. 8e represents the change over time of the mean molar fraction of oxygen throughout the duration of the transient phase illustrated in FIG. 8d, from t=0 to t=T'. In the group of cells A, the mean molar fraction decreases and always remains greater than the value achieved during the stabilization, that is to say around 0.166. In the group of cells B, the mean molar fraction only increases to also reach the stabilization value of 0.166. Such values of the mean molar fraction make a substantial drop in performance for one or the other group of cells unlikely.

Thus, by systematically carrying out a step of purging the groups of cells between two successive selective supply steps, and by ensuring an identical flow direction in the groups of cells between the supply step and the purge step, the generation of any depleted localized zone in the groups of cells is prevented. The supply process according to the invention, applied to the fuel cell according to the second embodiment, thus makes it possible to prevent any temporary drop in voltage or current produced by the fuel cell.

The supply process continues with another selective supply step, during which a first group is directly supplied, this group being different from that of the previous supply step, and the last group, located at the end of the fluidic pathway, is also different from that of the previous supply step.

It is observed that, during the following supply step, the flow direction at the first group supplied is advantageously identical to the flow direction that occurred in this same group during the previous purge step. More specifically, in group B, the flow direction during the purge step goes from the manifold Ce-B towards the manifold Cs. During the following supply step, since group B becomes the first group supplied, the flow direction is then identical. Thus, there is no inversion of the profile of spatial distribution of the molar fraction of reactive species, which makes it possible to limit the impact of the formation of a new depleted zone migrating along the fluidic pathway. The spatial change in the profile of molar fraction of reactive species in each group during this transient phase is represented in FIG. 9a.

With reference to FIG. 9a, the transient phase of a time T does not reveal a discontinuity in the profile of molar fraction of reactive species in the group of cells B, but in the group A a sudden drop appears, with a minimum point P corresponding at the start to the outlet of the group B, then moving from the inlet Ce-A towards the outlet Cs-A. An inflection point initially appears in the group B, then moves along the flow pathway first up to the outlet Cs-B, then from Ce-A to Cs-A. The minimum is obtained for the fluid located at Cs-A at t=T/2, with a local molar fraction value of the order of 0.069.

With reference to FIG. 9b, the mean molar fraction of oxygen of each group is identical in each group of cells at the moment t=0. It only increases with the group of cells B. On the other hand, it drops for the group A, without however reaching the value $c_1$, since the minimum observed is around 0.120. This value is high enough to guarantee that the drop in performance observed remains very limited, even lower than that described in the case of FIG. 6b.

The fuel cell, described previously with two groups of cells, may comprise a larger number of groups of cells. The groups may then be supplied selectively, for example cyclically, as described in patent FR2975227.

Thus, with reference to FIG. 10a, in the case of a fuel cell comprising three groups of cells A, B, C, the outlet manifold of which is common to each group, the supply fluid introduced into the inlet manifold Ce-A of the first group A joins up with the common outlet manifold Cs and may then flow simultaneously into the next two groups, from the common outlet manifold Cs in the direction of the inlet manifold Ce-B, Ce-C of each of the two groups B and C. Thus, the first group supplied A is connected in series with the next two groups B and C, also referred to as last groups, which are connected to one another in parallel. It is thus possible to provide a discharge device (not shown) for at least one of the last groups or each of the last groups.

In order to limit the drop in voltage described above, it is advantageous for the purge step to be carried out so that the fluid flows into groups B and C, in the same direction as the flow direction into these groups during the previous supply step. Thus, there is an inversion of the flow direction between the supply step and the purge step only for the group A and not for the two groups B and C, which leads to a local drop in voltage only at group A, thus making it possible to limit its impact on the electrochemical performance of the fuel cell.

With reference to FIG. 10b, the fuel cell comprises three different groups of cells, the outlet manifolds Cs-A, Cs-B, Cs-C of which are different. In this example, the supply fluid is introduced into the inlet manifold Ce-A of group A then joins up with its outlet manifold Cs-A, and flows in a distribution pipe 331AB to the inlet manifold Ce-B of group B, then to its outlet manifold Cs-B, and flows in a distribution pipe 331BC to the inlet manifold Ce-C of group C, and finally to the outlet manifold Cs-C. Thus, the flow direction in the various groups is co-current from one group to the next, that is to say that it flows from the inlet manifold to the outlet manifold in each group. It is advantageous for the flow direction to be identical, from one supply step to the next, in order to limit the presence of a drop in voltage that migrates into all the groups of the fluidic pathway. Moreover, when the purge step is carried out so that the flow direction of the purge is identical to the flow direction of the previous supply step, any voltage drop effect is thus prevented (as described above).

Particular embodiments have just been described. Various variants and modifications will be apparent to those skilled in the art.

Thus, the duration of each supply and purge step and the frequency of alternation between the steps may depend on several criteria, for example parameters of the fuel cell (current delivered, temperature, etc.); the detection of a voltage level of the groups of cells as a function of a predefined and set threshold; the detection of a voltage level of the groups of cells as a function of a predefined threshold that varies as a function of the parameters of the fuel cell (current delivered, temperature, etc.); the detection or the estimation of the amount of pollutant within the fuel cell, etc. The criteria may be different for each of the supply and purge steps.

The invention claimed is:

1. A process for supplying a fuel cell comprising a stack of electrochemical cells divided into N groups of cells, where N≥2, with reactive species diluted in a carrier gas, the process comprising:
   (I) supplying a selected group of cells from the N groups with the reactive species diluted in the carrier gas, wherein the reactive species not consumed in the selected group of cells circulates in the other groups of cells via distribution lines that ensure fluidic communication among the N groups of cells and that are arranged so as to form a fluidic pathway for the reactive species to go from the selected group of cells to one or more last groups of cells forming an end of the fluidic pathway,
   (II) purging the N groups of cells after the supplying (I) by simultaneously supplying each of the N groups of cells with the reactive species, wherein each group of cells communicates with an outlet orifice of the fuel cell that enables fluidic discharging of the N groups of cells, and
   (III) subsequently repeating the supplying (I) followed by the purging (II) so that the purging (II) is performed between two successive supplyings (I), wherein selected groups of cells in the two successive supplyings (I) are different.

2. The process according to claim 1, wherein the fluidic distribution lines are arranged with respect to the N groups of cells so that a direction of fluidic flow of the reactive species in the one or more last groups of cells during the supplying (I) is identical to a direction of fluidic flow in the same groups of cells during the following purging (II).

3. The process according to claim 1, wherein the fluidic distribution lines are arranged with respect to the N groups of cells so that a direction of fluidic flow of the reactive species in each of the N groups during the supplying (I) is identical to a direction of fluidic flow in each of the same groups during the following purging (II).

4. The process according to claim 1, wherein the fluidic distribution lines are arranged with respect to the N groups of cells so that a direction of fluidic flow of the reactive species in the one or more last groups of cells during the purging (II) is identical to a direction of fluidic flow in the same groups of cells during the following supplying (I).

5. The process according to claim 1, wherein the fluidic distribution lines are arranged with respect to the N groups of cells so that a direction of fluidic flow of the reactive species in each of the N groups during the purging (II) is identical to a direction of fluidic flow in each of the same groups during the following supplying (I).

6. The process according to claim 1, wherein
   the electrochemical cells each comprise an anode and cathode, and
   the cathodes and/or the anodes of the stack of electrochemical cells are supplied with the reactive species diluted in the carrier fluid.

7. The process according to claim 6, wherein the cathodes are supplied with atmospheric air containing oxygen.

8. The process according to claim 1, wherein, during the purging (II), the reactive species has different molar flow rates at inlets of at least two of the N groups of cells.

9. The process according to claim 8, wherein, one of the at least two of the N groups of cells is a last group during the preceding supplying (I), which has a molar flow rate greater than that of at least one other group.

* * * * *